(12) United States Patent
Eager et al.

(10) Patent No.: US 7,531,986 B2
(45) Date of Patent: May 12, 2009

(54) POWER SUPPLY FOR BATTERY POWERED DEVICES

(75) Inventors: Jon S. Eager, Westlake, OH (US); Peter F. Hoffman, Avon, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 217 days.

(21) Appl. No.: 11/360,789

(22) Filed: Feb. 23, 2006

(65) Prior Publication Data

US 2007/0194750 A1 Aug. 23, 2007

(51) Int. Cl.
*H02J 7/00* (2006.01)
(52) U.S. Cl. .................. 320/116; 320/110; 320/114
(58) Field of Classification Search .......... 320/110, 320/114, 111, 127, 128, 133, 137
See application file for complete search history.

(56) References Cited

U.S. PATENT DOCUMENTS

| | | | |
|---|---|---|---|
| 5,136,229 A | 8/1992 | Galvin | |
| 5,635,814 A | 6/1997 | Afzal et al. | |
| 5,739,596 A | 4/1998 | Takizawa et al. | |
| 5,780,992 A | 7/1998 | Beard | |
| 5,808,442 A | 9/1998 | Kaite et al. | |
| 5,814,969 A * | 9/1998 | Banyas | 320/112 |
| 5,831,350 A | 11/1998 | McConkey et al. | |
| 5,903,131 A | 5/1999 | Sekine et al. | |
| 5,963,010 A * | 10/1999 | Hayashi et al. | 320/106 |
| 6,021,332 A * | 2/2000 | Alberth et al. | 455/552.1 |
| 6,097,175 A | 8/2000 | Yoon | |
| 6,127,801 A | 10/2000 | Manor | |
| 6,127,809 A | 10/2000 | Kates et al. | |
| 6,184,654 B1 | 2/2001 | Bachner, III et al. | |
| 6,249,105 B1 | 6/2001 | Andrews et al. | |
| 6,314,308 B1 | 11/2001 | Sheynblat et al. | |
| 6,437,536 B2 | 8/2002 | Higuchi | |
| 6,479,963 B1 | 11/2002 | Manor et al. | |
| 6,509,717 B2 | 1/2003 | Lee | |
| 6,583,601 B2 | 6/2003 | Simoes et al. | |
| 6,597,151 B1 | 7/2003 | Price et al. | |

(Continued)

FOREIGN PATENT DOCUMENTS

EP 0718951 A 6/1996

(Continued)

OTHER PUBLICATIONS

CHARGE2GO, Product Specs, 2004, 3 pages, http://www.chargetogo.com/specs.html.

(Continued)

*Primary Examiner*—Akm E Ullah
*Assistant Examiner*—Nguyen Tran
(74) *Attorney, Agent, or Firm*—Gregory J. Adams

(57) ABSTRACT

An auxiliary power supply (150) includes an auxiliary battery (152), power supply circuitry (154), and a connector (108*b*). The power supply circuitry (154) supplies an output which provides electrical energy for powering the electrical circuitry (102) of a battery powered device (100) and for recharging a battery (104) associated therewith. In one embodiment, the power supply circuitry (154) supplies an output current which is a function of the charge state of the auxiliary battery (152) and a load current presented by the electrical circuitry (102).

6 Claims, 8 Drawing Sheets

U.S. PATENT DOCUMENTS

| | | | |
|---|---|---|---|
| 6,774,604 B2 | 8/2004 | Matsuda et al. | |
| 6,821,670 B2 | 11/2004 | Hsuch | |
| 6,864,664 B2 | 3/2005 | Clift | |
| 6,864,666 B2 | 3/2005 | Breen et al. | |
| 7,057,372 B2 | 6/2006 | Chen et al. | |
| 2001/0003205 A1 | 6/2001 | Gilbert | |
| 2001/0020838 A1 | 9/2001 | Malackowski | |
| 2002/0039016 A1 | 4/2002 | You et al. | |
| 2002/0093311 A1 | 7/2002 | Stryker et al. | |
| 2002/0101218 A1* | 8/2002 | Koenck et al. | 320/140 |
| 2003/0094924 A1 | 5/2003 | Oh | |
| 2003/0205988 A1* | 11/2003 | Vaisnys et al. | 320/116 |
| 2003/0220145 A1 | 11/2003 | Erickson et al. | |
| 2004/0021446 A1 | 2/2004 | Bang et al. | |
| 2004/0164715 A1 | 8/2004 | Nawa et al. | |
| 2004/0204171 A1 | 10/2004 | Chien | |
| 2004/0217739 A1 | 11/2004 | Cummings | |
| 2005/0077869 A1 | 4/2005 | Yueh | |
| 2005/0099156 A1* | 5/2005 | Brenner | 320/116 |
| 2005/0127871 A1 | 6/2005 | Orikasa | |
| 2005/0162132 A1* | 7/2005 | Nagasawa | 320/128 |
| 2005/0174094 A1 | 8/2005 | Purdy et al. | |
| 2005/0189909 A1 | 9/2005 | Guthrie et al. | |
| 2005/0280398 A1 | 12/2005 | Lee et al. | |
| 2006/0119324 A1 | 6/2006 | Kim | |
| 2006/0145661 A1* | 7/2006 | Patino et al. | 320/116 |
| 2006/0208695 A1 | 9/2006 | Weinstein et al. | |
| 2006/0226805 A1 | 10/2006 | Yu | |
| 2006/0232243 A1 | 10/2006 | Dabdoub et al. | |
| 2007/0063669 A1 | 3/2007 | Keating | |

FOREIGN PATENT DOCUMENTS

| | | |
|---|---|---|
| EP | 1113562 A | 7/2001 |
| EP | 1185104 A | 3/2002 |
| EP | 1523081 A | 4/2005 |
| EP | 1569315 A | 8/2005 |
| EP | 1603008 A | 12/2005 |
| EP | 1715241 A | 10/2006 |
| WO | 94/07293 A | 3/1994 |
| WO | 97/49159 A | 12/1997 |
| WO | 00/07275 A | 2/2000 |
| WO | 0122696 A | 3/2001 |
| WO | 02/17460 A | 2/2002 |

OTHER PUBLICATIONS

Techtium Hybrid Battery Management Technology, TCM-EXT06R8 External Charger Circuit from Single-Cell Primary Battery to GSM Cellular Phone datasheet, Jan. 2005, pp. 1-8, www.Techtium.com.
Martinez, et al., Intersil Smart Battery Primer Application Note, Jul. 11, 2005, pp. 1-10, AN126.0, www.intersil.com.
Cellboost, Frequently Asked Questions, downloaded Feb. 8, 2006, 2 pages, http://www.cellboost.com/us/faq.htm.
Cellboost, How to use Cellboost, downloaded Feb. 8, 2006, 3 pages, http://www.cellboost.com/us/how_cellboost.htm.
Cellboost, How to use iRecharge, downloaded Feb. 8, 2006, 2 pages, http://www.cellboost.com/us/how_irecharge.htm.
Cellboost, Products for Game Players, downloaded Feb. 8, 2006, 2 pages, http://www.cellboost.com/us/game_compatibility_psp1.htm.
Techtium, Products, downloaded Feb. 8, 2006, 4 pages, http://www.techtium.com/products.htm.
Techtium Hybrid Battery Management Technology, TEC103 Step-Up Converter and Chrger Controller from Primary Battery to NiCad, NiMH, or Li-Ion Secondary Batteries datasheet, downloaded Feb. 9, 2006, pp. 1-28, http://www.techtium.com/PDF/TEC103.pdf.
Patent Cooperation Treaty (PCT), International Search Report and Written Opinion for Application PCT/US2007/004575, filed Feb. 20, 2007, mailed Dec. 18, 2007, European Patent Office, Netherlands.
3COM Corporation, Handbook for the Palm VII Organizer, 1998, 302 pages.
Shawn Barnett, Palm VII, Pen Computing Magazine, 1995-1999, 5 pages, http://www.pencomputing.com/palm/Reviews/palm7_main.html.
Motorola, Talkabout Personal Interactive Communicator Model T900 User's Guide, 2000, title page, table of contents, pp. 1-53, notes and copyright page.
Research in Motion, RIM 950 & 957 Wireless Handhelds Installation and Getting Started Guide, 2001, 98 pages.
Eveready Battery Company, Inc., Eveready Carbon Zinc (Zn/MnO2) Application Manual, Nov. 6, 2001, pp. 1-13.
Eveready Battery Company, Inc., Energizer Cylindrical Alkaline Application Manual, Nov. 6, 2001, pp. 1-11.
Telephony Design, Blackberry (Research in Motion), Apr. 2, 2002, 5 pages, http://weblogger.com/stories/storyReader$136.
Eveready Battery Company, Inc., Energizer No. 1215 Engineering Datasheet, Oct. 2002, 2 pages, www.energizer.com.
Energizer, Application Manual Lithium Iron Disulfide (LiFeS2), 2005, pp. 1-7, http://data.energizer.com.
Energizer Holdings, Inc., Energizer NH15-2500 Product Datasheet, Nov. 2005, 1 page, www.energizer.com.
Energizer Holdings, Inc., Energizer E91 Product Datasheet, Aug. 2006, pp. 1-2, www. energizer.com.
Energizer Holdings, Inc., Energizer L91 Product Datasheet, Sep. 2006, pp. 1-2, www. energizer.com.
Patent Cooperation Treaty (PCT), International Search Report and Written Opinion for Application PCT/2008/000952, filed Jan. 24, 2008, mailed Jun. 20, 2008, European Patent Office, Netherlands.
Sullivan, et al., The Heat Stake Advantage, Assembly update Plastics Assembly, Jan.-Feb. 2003, pp. 12-13, Specialized Assembly Systems LLC.
Techtium. News & Events Techtium Announces Launch of Mobile-UPS, an Analog Battery Management IC for Portable Devices, Sep. 4, 2001, 2 pages, http://www.techtium.com/news-september42001.htm.
Techtium. News & Events On Board hybrid battery management chip makes built-in mobile charging and mobile UPS a reality. Feb. 28, 2002, 1 page, http://www.techtium.com/news-Feb28-2002.htm.
Office Action mailed on Jun. 23, 2008 in U.S. Appl. No. 11/385,209.
Patent Cooperation Treaty (PCT), International Search Report and Written Opinion for Application No. PCT/US2008/052002, filed. Jan. 25, 2008, mailed Jul. 2, 2008, European Patent Office, Netherlands.
Patent Cooperation Treaty (PCT), International Search Report & Written Opinion for Application PCT/US2007/004627 filed Feb. 20, 2007, Mailed Oct. 19, 2007, 12 pgs., European Patent Office, Netherlands.
Patent Cooperation Treaty (PCT), International Search Report and Written Opinion for Application No. PCT/US2008/005970, filed May 8, 2008, mailed Dec. 5, 2008, European Patent Office, Netherlands.

* cited by examiner

POWER SUPPLY FOR BATTERY POWERED DEVICES

BACKGROUND

The present invention relates to power supplies for battery powered devices. It finds particular application to situations in which it is desirable to supplement the energy provided by or otherwise charge the main battery of a battery powered device with energy from an auxiliary battery.

Recent years have seen a proliferation of battery powered devices. Digital cameras, personal digital assistants (PDAs), hand held games, portable audio players, remote controls, wireless computer keyboards and mice, portable and remote data communications devices, and mobile telephones are but a few examples.

These devices typically include one or more main batteries which power the device during normal operation. Where the main batteries are rechargeable (secondary), the devices are sometimes provided with battery charging circuitry which provides electrical energy for charging the batteries. Depending on the implementation, the charging circuitry may be located either internal or external to the device itself. In any case, the charging circuitry is ordinarily powered from an alternating current (AC) power outlet, a 12 volt direct current (VDC) automobile power outlet, or the like. Consequently, the device must be returned to a fixed or semi-fixed location for charging.

So-called hybrid battery management technology, which uses an external auxiliary battery together with associated charge control circuitry, has been used to provide supplemental power to battery powered devices. In one implementation, the auxiliary battery and charge control circuitry have been housed in a generally cylindrical housing, which has been suspended at one end of a cable, with the other end connected to the positive and negative terminals of the charging or power port of the battery powered device.

FIG. 1 shows the output current $I_{out}$ provided to a device having a lithium ion (Li-ion) main battery according to a hybrid battery management technique. Where the main battery voltage is less than a first value, the output current is substantially independent of the main battery voltage. Where the main battery voltage has a relatively higher value, the output current is a substantially linear function of the main battery voltage. Where main battery voltage has had a still higher value, the output current has again been substantially independent of the main battery voltage. As can also be seen in FIG. 1, the output current has also been a function of the auxiliary battery voltage.

While these techniques have provided for more convenient charging of the device's main battery during mobile operation, there remains room for improvement. In particular, it remains desirable to extend the operating life of the auxiliary battery while minimizing modifications to the battery powered device. In many cases, it is also desirable that the external device have a form factor which complements that of the battery powered device.

SUMMARY

Aspects of the present invention address these matters, and others.

According to a first aspect of the invention, an auxiliary power supply is adapted for use with a battery powered device including first electrical circuitry which presents a time varying electrical load and a first rechargeable battery which provides electrical energy to the first electrical circuitry. The auxiliary power supply includes a battery receiving region adapted to receive a second battery, and second electrical circuitry. The second electrical circuitry receives a signal from the battery powered device. The signal is indicative of the magnitude of the time varying electrical load. The second electrical circuitry also utilizes energy from the second battery to produce a power supply output for recharging the first rechargeable battery and for providing electrical energy to the first electrical circuitry, and adjusts the power supply output as a function of the charge state of the first rechargeable battery, the charge state of the second battery, and the signal. The auxiliary power supply also includes a first electrical connector in operative communication with the second electrical circuitry and adapted to selectively electrically connect the power supply output to the battery powered device.

According to another aspect of the invention, an apparatus is adapted to supply electrical energy to a battery powered device including a first, rechargeable battery and first electrical circuitry, wherein the first electrical circuitry receives electrical energy from the first battery and presents a time varying electrical load current during operation of the device. The apparatus includes a first housing which defines a battery receiving region, first and second battery contacts for making electrical contact with a second battery received in the battery receiving region, a first electrical connector in mechanical communication with the first housing and disposed electrically between the second battery and the first electrical circuitry, and second electrical circuitry. The second electrical circuitry receives energy from the second battery, generates an output for supplying electrical energy to the first electrical circuitry and for recharging the first battery, and adjusts the output as a function of the state of charge of the first battery and a signal indicative of the time varying electrical load current.

According to another aspect of the invention, a power supply is adapted for use with a battery powered device including first electrical circuitry which presents a time varying electrical load current and a first, rechargeable battery which supplies electrical energy to the first electrical circuitry. The power supply includes a battery receiving region adapted to receive a second battery, means for determining a state of charge of the first battery, electrical circuit means operatively connected to the second battery for supplying electrical energy to the first electrical circuitry and to the first battery, means for receiving a signal indicative of the time varying electrical load current, and an electrical connector disposed electrically between the second battery and the first electrical circuitry. The electrical circuit means produces an output which is a function of the state of charge of the first battery and the time varying electrical load current.

According to still another aspect of the present invention, an apparatus includes a battery powered device and a power supply. The battery powered device includes a first housing which defines a first battery receiving region adapted to receive a first, rechargeable battery, and first electrical circuitry disposed in the first housing which receives electrical energy from the first battery and draws a time varying electrical load current. The battery powered device also includes means for providing an electrical signal indicative of the time varying electrical load current, and a first electrical connector operatively electrically connected to the first battery, the first electrical circuitry, and the means for providing. The power supply includes a second housing which defines a second battery receiving region adapted to receive a second battery, means for receiving the signal, and power supply circuitry disposed in the second housing. The power supply circuitry receives electrical energy from the second battery, generates an output for supplying energy to the first electrical circuitry and the first battery, and adjusts the output as a function of the state of charge of the first battery and the signal. The power supply also includes a second electrical connector carried by the second housing. The second electrical connector is operatively electrically connected to the power supply circuitry and the means for receiving.

Those skilled in the art will recognize still other aspects of the present invention upon reading and understanding the attached description.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 2:
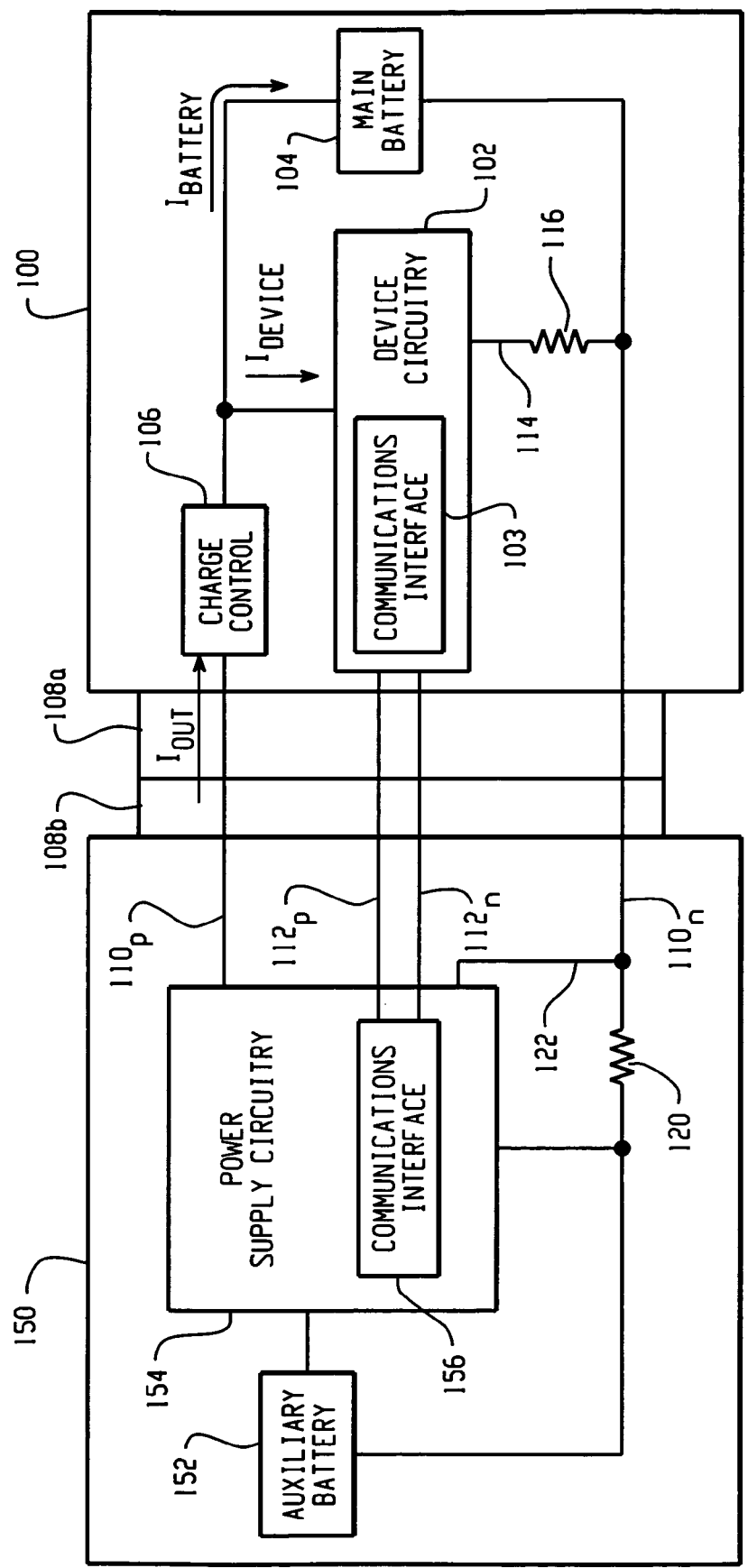
FIG. 2 is an electrical block diagram of an auxiliary power supply connected to a battery powered device.

With reference to FIG. 2, a battery powered device 100 includes device electrical circuitry 102, one or more main batteries 104, charge control circuitry 106, and a main device electrical connector 108a.

The electrical circuitry 102 performs some or all of the functionality provided by the battery powered device 100. Depending on the type of electrical device 100, the electrical circuitry 102 may take any number of forms. For example, the electrical circuitry 102 may perform the electrical functions required of a camera, PDA, mobile phone, game device, bar code reader, computer mouse or keyboard, portable or remote communications device, or the like, although other types of devices 100 and electrical circuitry 102 are contemplated.

The device circuitry 102 may also include a communications interface 103 adapted to provide communications with an external device or devices. In one embodiment, the communications interface is a known universal serial bus (USB) communications interface which provides digital communications with external devices, for example an external computer. Other serial, parallel, or analog communications interfaces are also contemplated.

In normal operation, the electrical circuitry 102 is powered by one or more main batteries 104. The chemistry, form factor, and number of the batteries 104 employed in a given device 100 are generally dependent on the type of device 100 and the requirements of the electrical circuitry 102. In many cases, however, the battery or batteries 104 are secondary batteries. Examples of currently available secondary battery chemistries Li-ion, nickel metal hydride (NiMH), nickel cadmium (NiCd), Li-ion polymer, and reusable alkaline. Commonly available battery form factors include generally cylindrical batteries such as conventional AAA, AA, C, and D size cells, as well as generally rectangular or prismatic batteries.

The main battery 104 may also be a so-called smart battery which operates according to the known smart battery standard. Other battery chemistries and form factors are also contemplated.

The charge control circuitry 106, which provides functionality related to the charging of the main battery or batteries 104, is disposed electrically between the electrical connector 108 and the battery 104. In an implementation which is particularly well suited to devices 100 in which the bulk of the charge control functionality is located external to the device 100, the charge control circuitry includes a diode, transistor, or components which protects the device 100 if the main device connector 108a is shorted, connected to external signals of the incorrect polarity, subjected to an over voltage, or the like. In another implementation, the charge control circuitry 102 may include circuitry which controls the voltage and/or current applied to the battery or batteries 104. Such circuits, which commonly receive power from a power cube connected to the AC mains or an automotive 12 VDC power source, are known to those skilled in the art and are ordinarily implemented based on the desired charging functionality and the characteristics of the battery 104. The charge control circuitry 106 may also be omitted. Some or all of the charge control circuitry 106, the device electrical circuitry 102, and the communications interface (103) may be implemented in a single integrated circuit or application specific integrated circuit (ASIC); they may also be implemented in multiple integrated circuits or discrete components.

The main device electrical connector 108a provides removable electrical connections between the device 100 and the external environment. In the exemplary USB interface, the connector 108a is a standard USB connector which provides positive $110_p$ and negative $110_n$ electrical power connections, as well as positive $112_p$ and negative $112_n$ data connections. The main device connector 108a may also provide other electrical connections relevant to the particular device 100, such as data or memory connections, control connections, or the like. The main device connector 108a may also be implemented as one more physical connectors; such a configuration is particularly useful where it is desirable to allow the device 100 to be independently connected to more than one external device.

With ongoing reference to FIG. 2, the total current $I_{out}$ received by the battery powered device 100 through the electrical connector 108a can be expressed as follows:

$$I_{out}=I_{device}+I_{battery} \qquad \text{Equation 1}$$

where $I_{device}$ is the load current drawn by the device circuitry 103 and $I_{battery}$ is the current drawn by the main battery 104. To measure the device load current $I_{device}$, a sense resistor 116 may be disposed electrically in series between the device electrical circuitry 102 and the negative $110_n$ or positive $110_p$ power connections. As will be appreciated, the voltage across the sense resistor 116 provides a signal 114 indicative of the load current drawn by the device electrical circuitry 102. The current drawn by the main battery 104 could likewise be determined using an analogous sense resistor in series with the battery 104.

Figure 3:
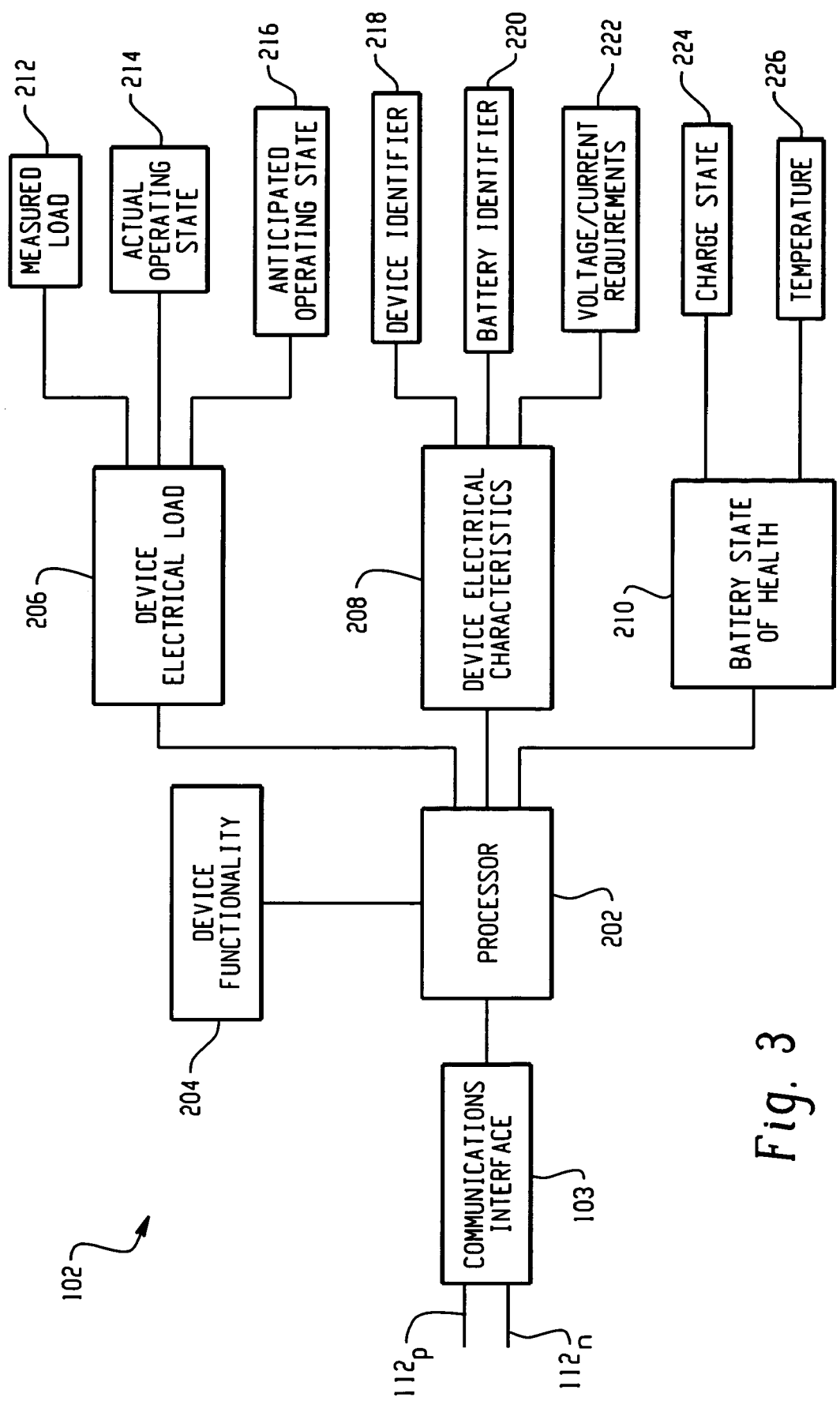
FIG. 3 is a functional block diagram of an electrical device.

Turning now to FIG. 3, the device circuitry 102 typically includes a processor 202 such as a microprocessor or microcontroller which executes instructions in an associated memory. The processor 202 coordinates the transfer of data via the communications interface 103 and cooperates with the other device specific circuitry 204 to provide the desired device functionality. The processor 202 also receives information relating to or otherwise controls factors which influence one or more of the device electrical load 206, the device electrical characteristics 208, and the main battery state of health 210.

The device electrical load information 206 includes information indicative of one or more of the actual or anticipated power requirements of the device electrical circuitry 102. The measured load 212 includes a measured value of the load presented by the device electrical circuitry 102. In one implementation, the measured load is the value of $I_{device}$ obtained by measuring the voltage across the sense resistor 116.

The actual operating state information 214 includes information relating to the current operating state or mode of the device 100. For example, many devices are characterized by relatively long periods of relatively low power or quiescent operation interspersed with periods of relatively higher power operation. Depending on the nature of the device, the device typically enters a particular operating state in response to an operator input or command or automatically based on another event or criterion. In the case of a mobile telephone, for example, the user may initiate or accept a telephone call, during which time the circuitry 102 places a relatively high load on the main battery 104. Moreover, the power output of the telephone's transmitter may be adjusted based on the strength of the local radio frequency signal, again influencing load placed on the main battery 104. In any case, the operating state or states 214 of the device may in many cases provide a reasonable indication of the load presented to the main battery 104.

The anticipated operating state information 216 includes information relating to an anticipated or predicted operating state of the device 100. A portable or remote data communications device, for example, may be programmed to upload or download data at one or more scheduled times during the course of day, week, or other time period. The device 100 may also be programmed to transfer data at desired time intervals (e.g., hourly, daily, or the like), or following the occurrence of certain events. The device 100 may also be programmed to predict future operating states based on the operating history of the device, for example where the user has caused the device to enter a particular operating state at regular times or intervals. In any case, the anticipated operating state 216 may provide a reasonable indication of an anticipated future operating state, and hence an anticipated load to be presented to the main battery 104.

The device electrical characteristics 208 include information relating to the power requirements of the device 100. In one implementation, a device identifier 218 or code is stored in a memory associated with the device 100. As one example, the device identifier 218 identifies the manufacturer and model number of the device 100. As another example, the device identifier 218 may identify the device 100 as belonging to a class of devices having similar power requirements. Analogously, a battery identifier 220 may also be used to identify the manufacturer and/or model number of the main battery 104, or otherwise identify the battery as being of a particular class of batteries having similar characteristics. In another implementation, specific battery voltage, current, capacity, chemistry or other characteristics 222 of the device 100 may be provided, either in a memory associated with the device 100 or a memory associated with the main battery 104.

The battery state of health 210 includes information indicative of the health of the main battery 104. This information may include information indicative of the battery charge state 224, for example the measured output voltage $V_{main}$ of the main battery 104. In another example, the charge state may be determined by way of a so called fuel gauge, in which the charge remaining in the main battery is estimated based on the capacity of the battery and a measurement or estimate of the energy drawn from it. Another example of battery health information 210 is a battery temperature 226, which is typically measured using a thermistor of other temperature sensitive device.

Returning now to FIG. 2, a battery powered auxiliary power supply 150 includes one or more auxiliary batteries 152, power supply circuitry 154, and an auxiliary electrical connector 108b. In one embodiment, and as will be described in greater detail below, the auxiliary power supply 150 is adapted to interface with a number of different main devices 100 having different electrical power requirements. In another embodiment, a family of external power supplies is provided, with the members of the family having different load ratings or capacities.

The auxiliary power supply 150 includes a battery receiving region which includes the requisite battery contacts and which accepts one or more auxiliary batteries 152. The chemistry, form factor, and number of the auxiliary batteries 152 employed in a given power supply 150 are generally dependent on the power requirements of the main device or devices 100 with which the external power supply 150 is expected to operate, the desired form factor and portability of the external power supply 150, and like factors.

The power supply circuitry 154, which is powered by the auxiliary battery 152, provides electrical energy for powering the device electronics 102 and charging the main battery 104. Also associated with the auxiliary power supply 150 is a communication interface 156. In the illustrated embodiment, the communication interface 156 is a USB interface, although the interface would ordinarily be selected for compatibility with the device or devices 100 with which the auxiliary power supply 150 is expected to operate. Note that the charge control circuit 154 and communications interface 156 may be implemented in one or more integrated circuits, ASICs, or other devices.

A sense resistor 120 analogous to the sense resistor 116 provides a signal indicative of the output current $I_{out}$ being supplied to the battery powered device 110.

The power supply connector 108b is adapted to matingly engage the battery powered device connector 108a to provide the power $110_p$, $110_n$ and data $112_p$, $112_n$ connections.

Figure 4:
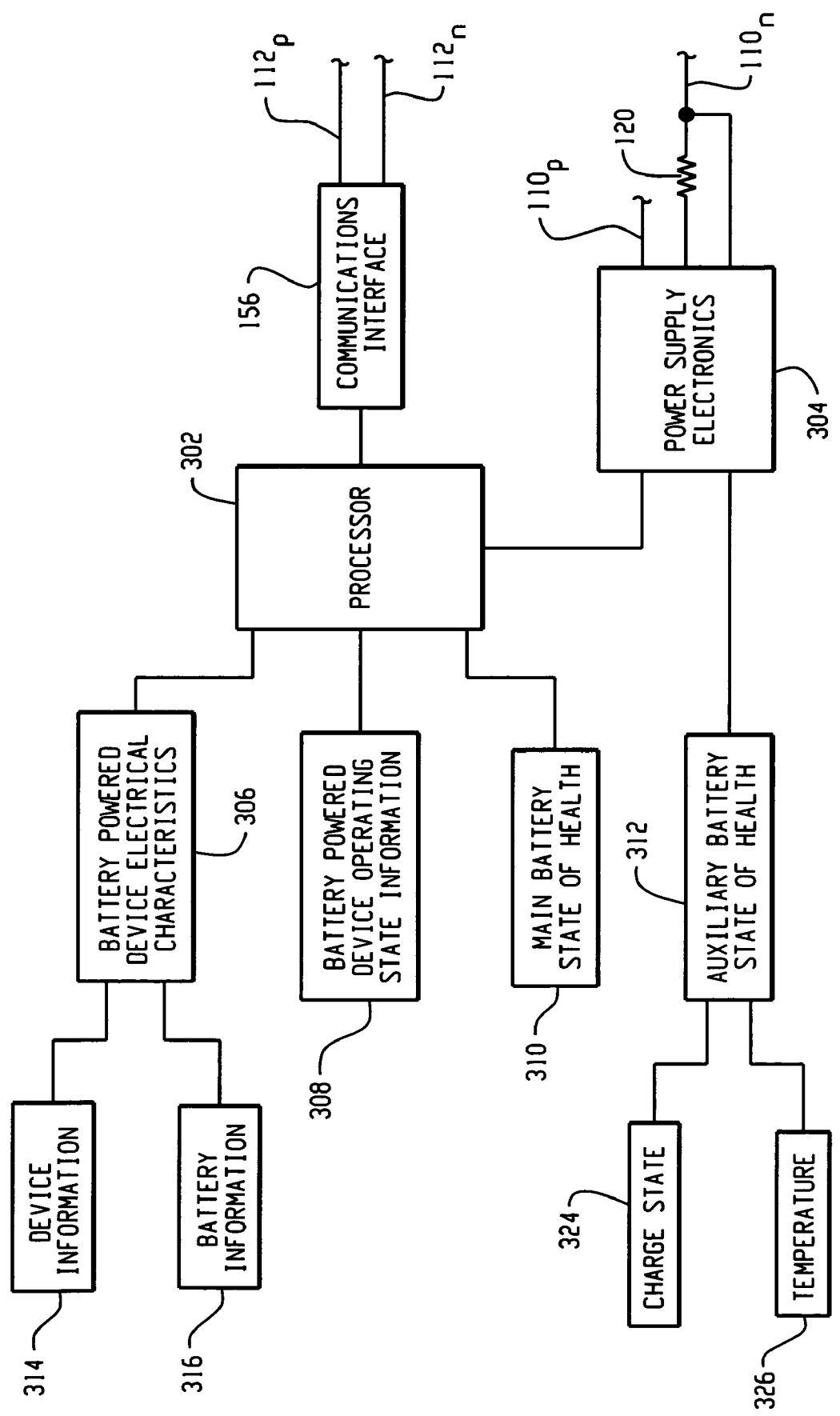
FIG. 4 is a functional block diagram of an auxiliary power supply.

Turning now to FIG. 4, the power supply circuitry 154 includes advantageously includes a processor 302 such as a microprocessor or microcontroller which executes instructions stored in an associated memory. The processor 302 interfaces with the communications interface 156 and with power supply electronics 304, and also receives information relating to one or more of the battery powered device electrical characteristics 306, the battery powered device operating state 308, and main battery state of health 310.

The battery powered device electrical information 306 includes information relating to the power and/or load requirements various main devices 100. In one implementation, the voltage, current, or other characteristics of various battery powered devices 100 are contained in a list or database stored in a memory accessible to the processor 302. The device identifier 218 received from a given main device is used to access the relevant information from the memory. In another implementation, the characteristics of various main batteries 104 are stored, with the battery identifier 220 received from a given main device used to access the relevant information. As will be appreciated, these arrangements facilitate the use of the external power supply 150 with battery powered devices 100 or batteries 104 having different power requirements.

The main device operating state information 308 includes information relating to the operating states or modes of one or more battery powered devices 100. In one implementation, the voltage, current, or other load requirements associated with the operating states of one or more battery powered devices 100 are included in a list or database stored in the memory. The actual 214 or anticipated 216 operating state information and the device identifier 218 identifier, if applicable, received from a given device 100 are used to access the pertinent information from the memory. Note that some or all of the device electrical characteristics 306 and operating state information 308 may be combined in a single list or database. In the mobile telephone described above, for example, the telephone may include a low power or idle mode and one or more transmit modes, each presenting a different electrical load. Other devices 100 may have different operating modes. As will be appreciated, the actual operating state 216 information may serve as a proxy for the measured load 212. Moreover, the anticipated operating state information 216 provides information which is ordinarily not available or often difficult to infer from the measured load 212 or the actual operating state 216.

The main battery state of health 310 includes main battery state of health 210 information received from the battery powered device 100, for example the main battery voltage $V_{main}$. In the embodiment of FIG. 2, the main battery voltage can ordinarily determined form the voltage at the positive power connection $110_p$. Alternately, the voltage may be obtained from another location. While the main battery state of health information 310 is shown as being provided directly to the power supply electronics 304, the information may also be communicated to the processor 302 via the communications interface 156.

The processor 302 is operatively connected to the power supply electronics 304. Various power supply circuits and topologies are known and can be readily implemented by those skilled in the art based on factors such as electrical characteristics of the battery powered device and its batteries. Advantageously, however, the voltage, current, and/or other output characteristics of the power supply electronics 304 are established based on information received from the processor 302. In particular, the processor 302 establishes the voltage and/or current setpoints of the power supply electronics 304 as a function of one or more of the device electrical characteristics 306, the device operating state information 308, and the main battery state of health 310.

The auxiliary battery state of health information 312 includes information relevant to the state of health of the auxiliary battery 152. Such information may include charge state information 324 such as a measured auxiliary battery voltage $V_{aux}$, the auxiliary battery temperature 326 or other information analogous to that described above in relation to the main battery 104. While the auxiliary battery state of health information 312 is shown as being provided directly to the power supply electronics 304, the information may also be provided to the processor 302.

Figure 1:
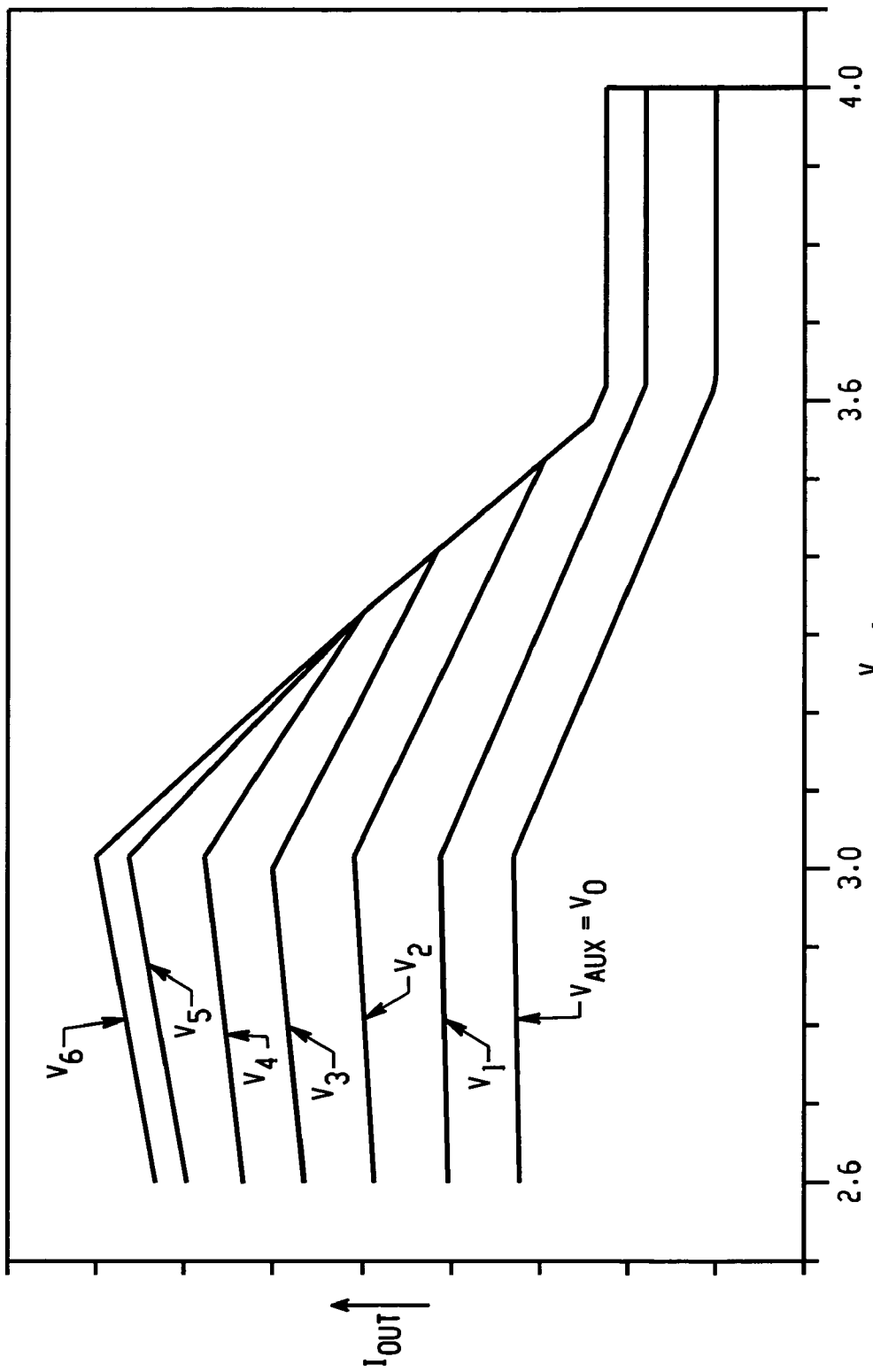
FIG. 1 depicts an output current provided by a prior art device.

In one implementation, the power supply electronics 304 can be configured to supply a total output current $I_{out}$ to the battery powered device 100 according to the transfer function of FIG. 1, where the output current $I_{out}$ is a function of the auxiliary battery voltage $V_{aux}$ and the main battery voltage $V_{main}$.

Figure 5:
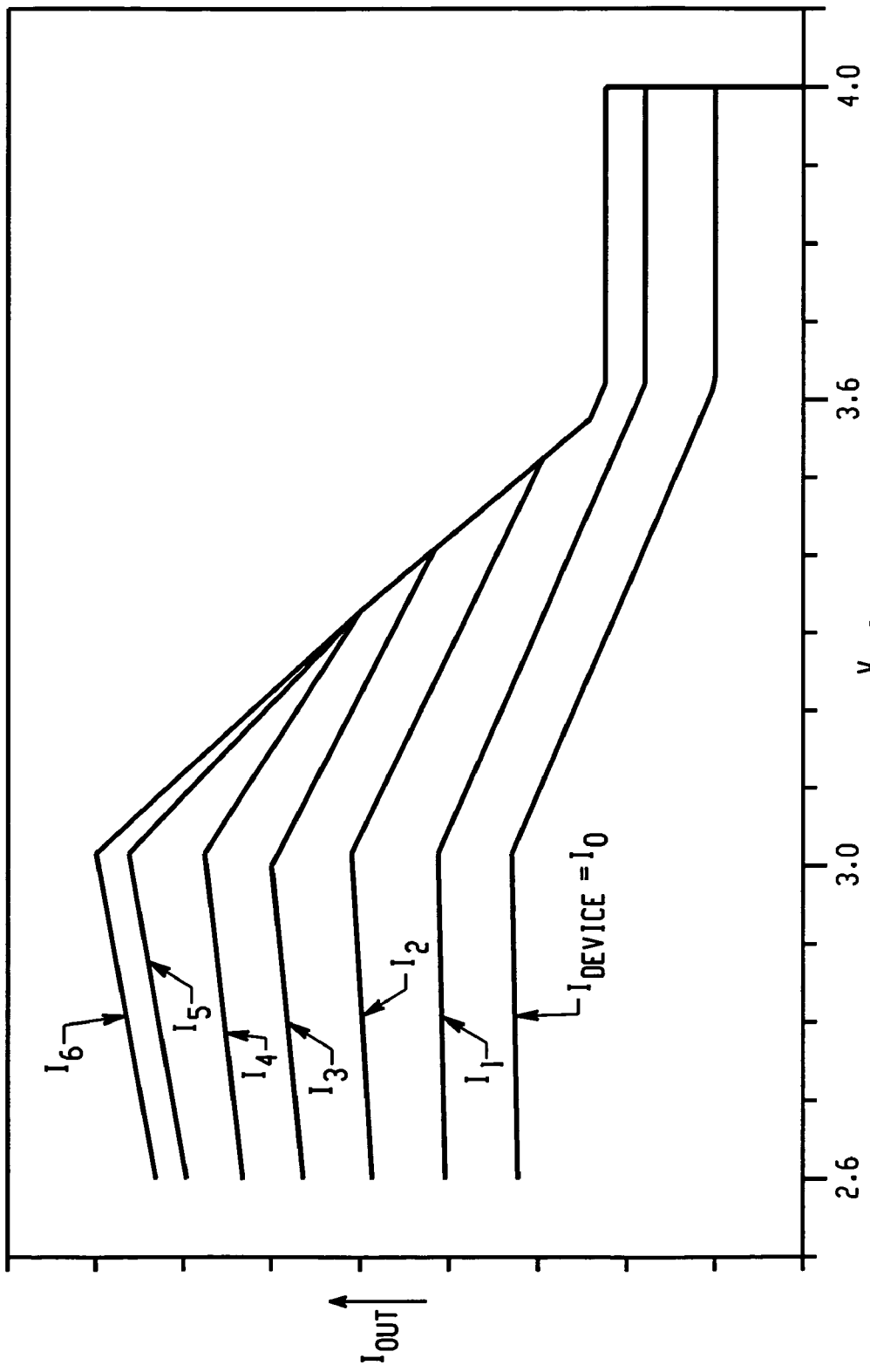
FIG. 5 depicts an output current provided by an auxiliary power supply.

However, the energy available from the auxiliary battery 154 may be more effectively utilized by varying or modulating the output of the external power supply 150 as a function of the actual or predicted load presented by the device electronics 102. FIG. 5 depicts the output current $I_{out}$ supplied by the power supply electronics 304 as a function of the main battery voltage $V_{main}$ for each of a plurality of device electrical circuit currents $I_{device}$, with $I_{device}$ generally increasing from $I_0$ to $I_6$, and where $I_0$ represents the load current with the device 100 turned off or in a relatively low power operating mode. In FIG. 5, the auxiliary battery voltage $V_{aux}$ is assumed to be constant for ease of illustration, it being understood that the output current $I_{out}$ is preferably also a function of the auxiliary battery voltage $V_{aux}$ as depicted generally in FIG. 1.

As can be seen, the output current supplied by the power supply electronics 304 is, for a given device electrical load $I_{device}$ and auxiliary battery voltage $V_{aux}$, at a maximum value where the main battery voltage $V_{main}$ is relatively low. The maximum output current $I_{out\,max}$ is advantageously set at a value which satisfies the following condition:

$$I_{battery0} + I_{device} > I_{out\,max} \geq I_{device} \quad \text{Equation 2}$$

where $I_{battery0}$ is the charge current that would be drawn by the main battery 104 if the current were not otherwise limited.

Such an arrangement assures that the external power supply 150 provides sufficient power to operate the battery powered device 100 while still providing energy to charge the main battery 104, albeit at a reduced rate. As discussed more fully above, the device current $I_{device}$ may be advantageously obtained by measuring the actual device current or inferred from an actual operating state of the battery powered device 100.

The maximum output current $I_{out\,max}$ may also be adjusted based on the value of an anticipated device operating state. Thus, where it is expected that the device will become active at a time in the future, the maximum output current may be increased to a level which charges the main battery as quickly as possible, or to a level which is expected to fully charge the main battery 104 before the device 100 enters the higher power operating state. As another example, the user may enter a command to charge the main battery 104 as quickly as possible or otherwise at a relatively faster rate, in which case the value of the maximum output current may be increased accordingly.

The output current $I_{out}$ can be adjusted by causing the processor 302 to vary the value of the sense resistor 120 as a function of the device current $I_{device}$. As will be appreciated, the current feedback is function of the value of the sense resistor 120. Consequently; decreasing the value of the sense resistor 120 increases the output current, while increasing the value decreases the output current. As discussed above, the value of the sense resistor may advantageously be limited to values at which Equation 2 is satisfied. As a result, the output current can be reduced to or held a level that is below the sum of the maximum charge acceptance rate for the main battery 104 and the load presented by the device electrical circuitry 102. Other techniques, such as the use of a programmable gain amplifier at the output of the sense resistor 120, may also be implemented.

The power supply electronics 304 may be implemented using the known TEC103 Step-Up Converter and Charge Controller integrated circuit available from Techtium, Ltd. of Tel Aviv, Israel. Other circuits and circuit configurations are also contemplated.

Various alternatives are possible. As will be appreciated, the functions implemented in the auxiliary power supply 150 ordinarily depend on the characteristics of or other information available from the battery powered device or devices 100 with which the auxiliary power supply 150 is expected to operate.

Moreover, the battery powered device 100 may also supply the device electrical load information 206 through a signal available at the connector 108a. In one implementation, a measured value of the device current $I_{device}$ may be provided via an analog voltage signal. In another, the actual 214 or anticipated 216 operating state information may be provided via a digital signal. In yet another, the desired signals may be provided in a two wire communications interface in which the signals are superimposed on the power signal, preferably as serial digital signals generated by modulating the voltage and/or current levels. In still another, the battery powered device 100 may supply an output current set point signal which is a function of the device current. In any case, the auxiliary power supply circuitry 154 includes suitable analog and/or digital circuitry for adjusting the value the output current $I_{out}$ as a function of the signal, for example the adjusting the effective value of the sense resistor 120.

As another alternative, the auxiliary battery 152 may be located in the auxiliary power supply 150, with some or all of the power supply circuitry 154 located in the battery powered device 100.

The above discussion has focused on providing information which is directly indicative of the load presented by the device electronics 102. In view of Equation 1, however, information indicative of the main battery current $I_{battery}$ may be provided, as subtracting the battery current $I_{battery}$ from the output current $I_{out}$ yields information indicative of the load presented by the device electronics 102.

Figure 6:
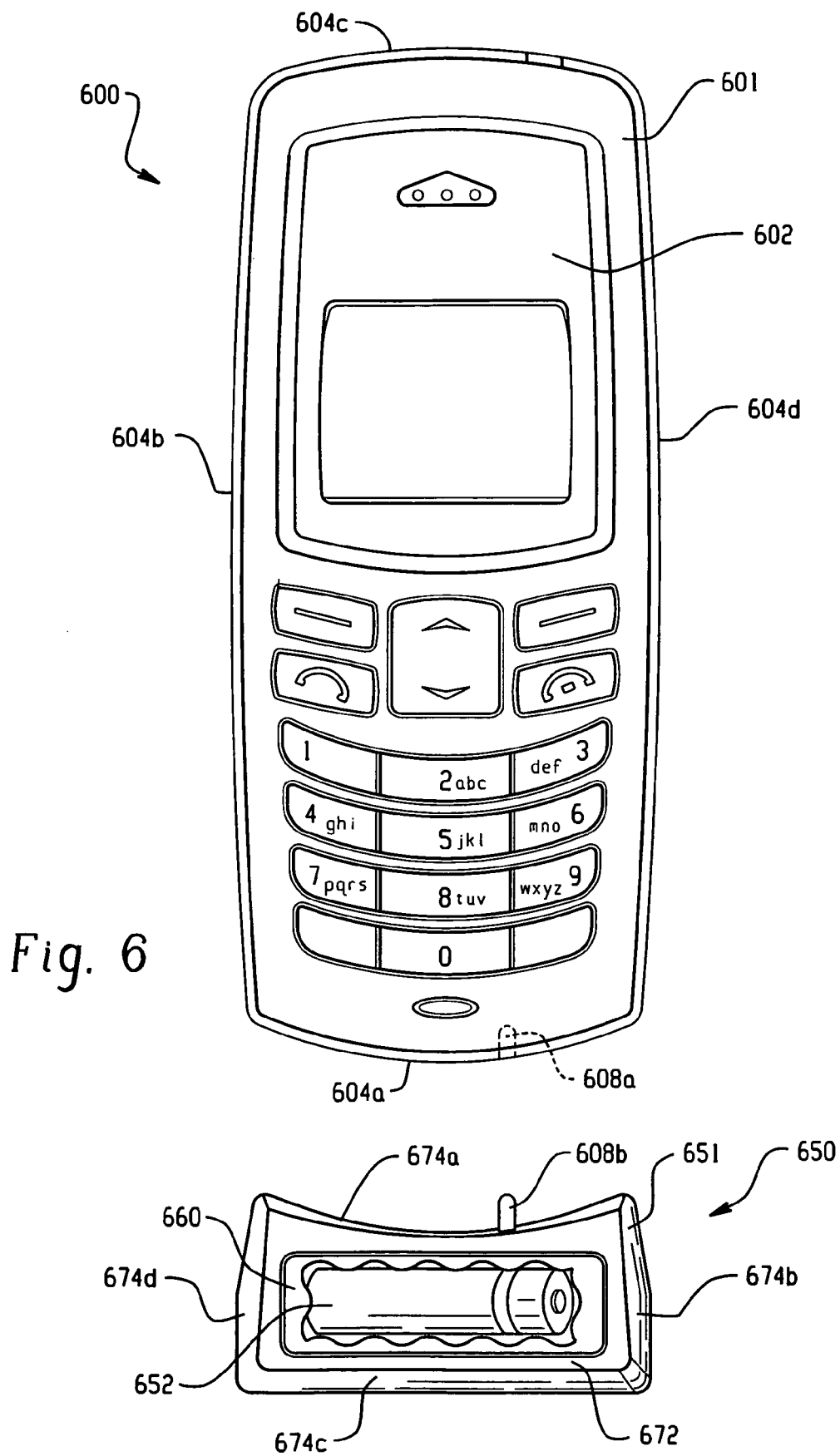
FIG. 6 depicts an auxiliary power supply and a mobile telephone.

Turning now to FIG. 6, an exemplary auxiliary power supply 650 is shown with a mobile telephone 600. The phone 600 includes a housing 601 having a front major surface 602, a spaced apart rear major surface, and additional surfaces 604a, 604b, 604c, and 604d. Located on the surface 604a is a female connector 608a.

The auxiliary power supply 650 includes a housing 651 having a front major surface 672, a spaced apart rear major surface, and additional surfaces 674a, 674b, 674c, and 674d. The auxiliary power supply 650 houses the power supply circuitry 154 and includes a battery receiving region which is adapted to selectively receive an auxiliary battery 652. A user removable cover 660 (shown in partial cutaway view to expose the battery 652) allows the user to selectively access the battery receiving region. A male connector 608b located on the surface 674a is adapted to matingly engage the female connector 608a. As illustrated, the curvature of the surface 674a substantially conforms to a curvature of the surface 604a, and the width of the housing 601 is approximately equal to the width of the housing 601 at the interface therebetween.

Figure 7:
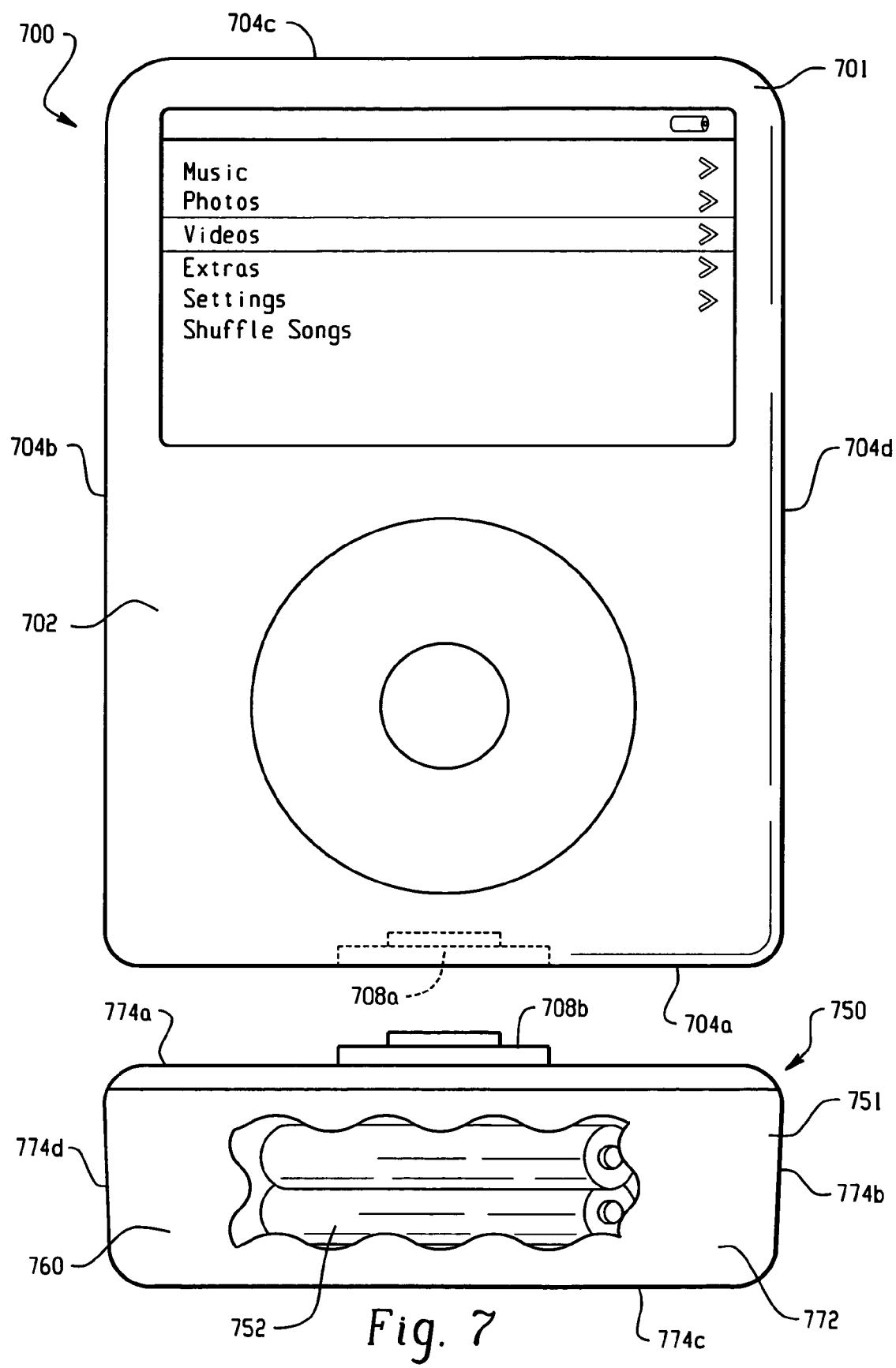
FIG. 7 depicts an auxiliary power supply and a portable entertainment device.

Turning now to FIG. 7, another exemplary auxiliary power supply 750 is shown with a portable entertainment device 700. The portable entertainment device 700 includes a housing 701 having a front major surface 702, a spaced apart rear major surface, and additional surfaces 704a, 704b, 704c, and 704d. Located on the surface 704a is a female connector 708a.

The auxiliary power supply 750 includes a housing 751 having a front major surface 772, a spaced apart rear major surface, and additional surfaces 774a, 774b, 774c, and 774d. The auxiliary power supply 750 houses the power supply circuitry 154 and includes a battery receiving region which contains the requisite positive and negative battery terminals and is adapted to selectively receive auxiliary batteries 752. A user removable cover 760 (shown in partial cutaway view to expose the batteries 752) allows the user to selectively access the battery receiving region. A male connector 708b located on the surface 774a is adapted to matingly engage the female connector 708a. As illustrated, the width of the housing 701 is approximately equal to the width of the housing 701 at the interface therebetween.

Other arrangements are also possible. For example, the auxiliary power supply may connect to one of the other surfaces of the main device. The auxiliary power supply and the device may also connect via a cable which includes suitable connectors, and may also have a cylindrical or other form factor which does not conform to that of the battery powered device.

In operation, the user operates the battery powered device 100 as desired. Of course, continued operation of the device 100 leads to the eventual discharge of the main battery 102. To recharge the battery, the user typically connects the device to a fixed charger.

Figure 8:
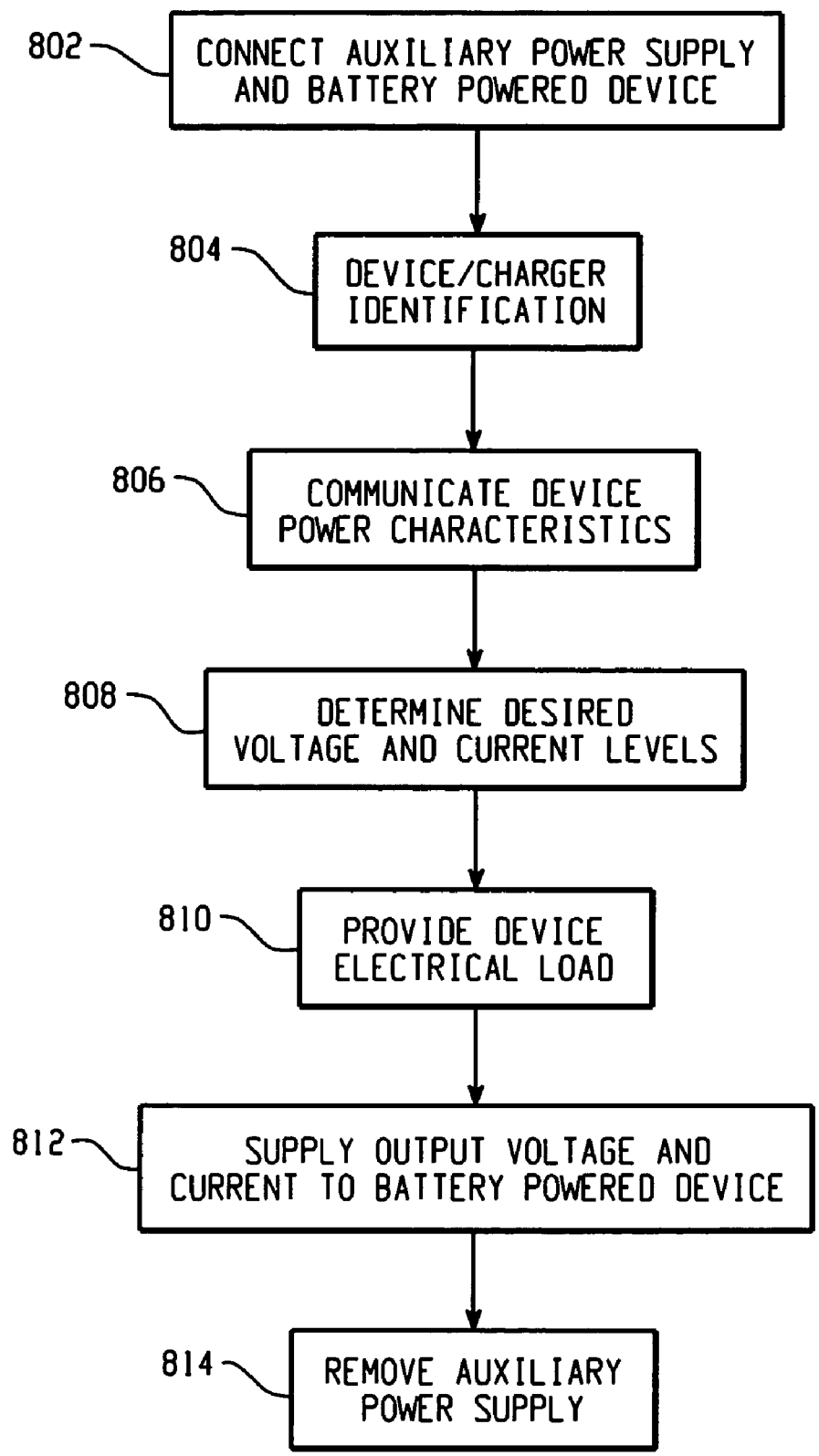
FIG. 8 depicts steps in the operation of an auxiliary power supply in conjunction with a battery powered device.

In some situations, such as where a power source required to operate the fixed charger is not readily available, the user may elect to use the external power supply 150. With reference to FIG. 8, the user connects the external power supply 150 and the battery powered device 100 through their corresponding electrical connector portions 108a, 108b at step 802.

Where the auxiliary power supply 150 and the main device 100 communicate through a USB interface, the devices undergo a USB enumeration process at 804. Once the external power supply 150 is identified as an external power source, the battery powered device may advantageously allow its communication interface 103 to operate outside the USB power standards.

If implemented, the battery powered device 100 provides the device electrical characteristics 208 to the external power supply 150 at step 806. At 808, the external power supply 150 uses the device power characteristic 208 to establish the desired voltage and current levels to be applied to the battery powered device 100.

At 810, the battery power device 100 provides the device electrical load information 206 to the external power supply 150. As noted above, the load information 206 may be provided by way of a measured value 212. Alternately, or in addition to the measured value 212, actual 214 and/or anticipated 216 operating state information may be transferred. Depending on the implementation, the information may be provided continuously or at various times during operation.

At 812, the auxiliary power supply 150 supplies an output voltage and current to the main device. As noted above, the power supply output is preferably a function of the electrical load presented by the device electrical circuitry 103.

At 814, the user disconnects the auxiliary power supply 150 from the main device.

The invention has been described with reference to the preferred embodiments. Of course, modifications and alterations will occur to others upon reading and understanding the preceding description. It is intended that the invention be construed as including all such modifications and alterations insofar as they come within the scope of the appended claims.

What is claimed is:

1. An auxiliary power supply for use with a battery powered device including first electrical circuitry which presents a time varying electrical load and a first rechargeable battery which provides electrical energy to the first electrical circuitry, the auxiliary power supply comprising:

a battery receiving region adapted to receive a second battery;

second electrical circuitry, wherein the second electrical circuitry receives a signal from the battery powered device, which signal is indicative of the magnitude of the time varying electrical load, wherein the second electrical circuitry utilizes energy from the second battery to produce a power supply output ($110_p$, $110_n$) for recharging the first rechargeable battery and for providing electrical energy to the first electrical circuitry, and wherein the second electrical circuitry adjusts the power supply output as a function of the charge state of the first rechargeable battery, the charge state of the second battery, and the signal;

a first electrical connector in operative communication with the second electrical circuitry and adapted to selectively electrically connect the power supply output to the battery powered device:

wherein the signal includes a measured value of the time varying electrical load and wherein the measured value of the time varying electrical load includes a measured value of an electrical load current, and wherein the second electrical circuitry adjusts the power supply output current as a function of the first rechargeable battery voltage, the second battery voltage, and the measured value of the time varying electrical load current.

2. The power supply of claim 1 wherein the second electrical circuitry maintains the power supply output current at a level which is substantially independent of the first rechargeable battery voltage when the first rechargeable battery voltage is below a first voltage, and wherein the level is a function of the measured value of the time varying electrical load current and the second battery voltage.

3. An apparatus for supplying electrical energy to a battery powered device including a first, rechargeable battery and first electrical circuitry, wherein the first electrical circuitry receives electrical energy from the first battery and presents a time varying electrical load current during operation of the device, the apparatus comprising:

a first housing which defines a battery receiving region;

first and second battery contacts for making electrical contact with a second battery received in the battery receiving region;

a first electrical connector in mechanical communication with the first housing and disposed electrically between the second battery and the first electrical circuitry;

second electrical circuitry, wherein the second electrical circuitry receives energy from the second battery, generates an output for supplying electrical energy to the first electrical circuitry and for recharging the first battery, and adjusts the output as a function of the state of charge of the first battery and a signal indicative of the time varying electrical load current;

wherein the output current is limited to a value which satisfies the relationship $$I_{battery0} + I_{device} > I_{out}$$

where $I_{out}$ is the value of the output current, $I_{device}$ is the time varying electrical load current, and $I_{battery0}$ is a current which would be drawn by the first battery if the output current were not limited.

4. An apparatus for supplying electrical energy to a battery powered device including a first, rechargeable battery and first electrical circuitry, wherein the first electrical circuitry receives electrical energy from the first battery and presents a time varying electrical load current during operation of the device, the apparatus comprising:

a first housing which defines a battery receiving region;

first and second battery contacts for making electrical contact with a second battery received in the battery receiving region;

a first electrical connector in mechanical communication with the first housing and disposed electrically between the second battery and the first electrical circuitry;

second electrical circuitry, wherein the second electrical circuitry receives energy from the second battery, generates an output for supplying electrical energy to the first electrical circuitry and for recharging the first battery, and adjusts the output as a function of the state of charge of the first battery and a signal indicative of the time varying electrical load current wherein the battery powered device includes a second housing having first and second major surfaces, a curved third surface, and a second electrical connector located on the third surface, and wherein the first housing includes fourth and fifth major surfaces, a sixth surface, wherein the first electrical connector is located on the sixth surface and adapted to selectively connect to the second electrical connector, wherein the sixth surface has a curvature which substantially conforms to the curvature of the third surface.

5. An apparatus comprising:

a battery powered device including:

a first housing which defines a first battery receiving region adapted to receive a first, rechargeable battery;

first electrical circuitry disposed in the first housing, wherein the first electrical circuitry receives electrical energy from the first battery and draws a time varying electrical load current;

means for providing an electrical signal indicative of the time varying electrical load current;

a first electrical connector operatively electrically connected to the first battery, the first electrical circuitry, and the means for providing;

a power supply including:

a second housing which defines a second battery receiving region adapted to receive a second battery;

means for receiving the signal;

power supply circuitry disposed in the second housing, wherein the power supply circuitry receives electrical energy from the second battery, generates an output for supplying energy to the first electrical circuitry and the first battery, and adjusts the output as a function of the state of charge of the first battery and the signal;

a second electrical connector carried by the second housing and operatively electrically connected to the power supply circuitry and the means for receiving;

wherein the battery powered device has at least a first operating state in which the first electrical circuitry draws a first electrical current and a second state in which the second electrical circuitry draws a different second electrical current, and wherein the signal is indicative of the operating state.

6. The apparatus of claim 5 wherein the signal is indicative of an anticipated operating state.

* * * * *